United States Patent
Yang et al.

(10) Patent No.: US 8,934,580 B2
(45) Date of Patent: Jan. 13, 2015

(54) METHOD AND APPARATUS FOR CHANNEL ESTIMATION IN MULTI-PATH CHANNEL

(75) Inventors: Yoonoh Yang, Anyang Gyeonggi-do (KR); Suhwan Lim, Anyang Gyeonggi-do (KR); Manyoung Jung, Anyang Gyeonggi-do (KR); Sangwook Lee, Anyang Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/582,906

(22) PCT Filed: Jul. 11, 2011

(86) PCT No.: PCT/KR2011/005055
§ 371 (c)(1),
(2), (4) Date: Sep. 5, 2012

(87) PCT Pub. No.: WO2012/015185
PCT Pub. Date: Feb. 2, 2012

(65) Prior Publication Data
US 2012/0328060 A1 Dec. 27, 2012

Related U.S. Application Data

(60) Provisional application No. 61/368,264, filed on Jul. 28, 2010.

(51) Int. Cl.
*H04L 27/06* (2006.01)
*H04L 25/02* (2006.01)
(52) U.S. Cl.
CPC ......... *H04L 25/0204* (2013.01); *H04L 25/0212* (2013.01)
USPC ........... 375/340; 375/251; 375/341; 375/347; 375/349; 455/561; 455/500; 370/342

(58) Field of Classification Search
CPC ............... H03H 17/0283; H03H 17/06; H04L 2025/0349; G06G 7/02
USPC .......... 375/340, 251, 341, 347, 349; 455/561, 455/500; 370/342
See application file for complete search history.

(56) References Cited

U.S. PATENT DOCUMENTS 5,796,788 A * 8/1998 Bottomley .................... 375/341
6,370,397 B1 * 4/2002 Popovic et al. ............... 455/561
(Continued)

FOREIGN PATENT DOCUMENTS

KR 10-2001-0043229 A 5/2001
KR 10-2004-0106022 A 12/2004
(Continued)

OTHER PUBLICATIONS

Lee et al., "Design of Nonuniformly Spaced Tapped-Delay-Line Equalizers for Sparse Multipath Channels," IEEE Transactions on Communications, vol. 52, No. 4, Apr. 2004, pp. 530-535.

*Primary Examiner* — Sam K Ahn
*Assistant Examiner* — Fabricio R Murillo Garcia
(74) *Attorney, Agent, or Firm* — Birch, Stewart, Kolasch & Birch, LLP

(57) ABSTRACT

A channel estimation method in a multipath channel, and which includes receiving a signal from a channel having multipath; obtaining information related to the number of paths and synchronization information related to each path from the received signal; estimating a channel using the obtained information related to the number of paths and synchronization information related to each path; calculating a metric using at least one impulse response value of a Square Root Raised Cosine (SRRC) filter and the obtained information; calculating an inverse metric of the calculated metric; and removing an inter-path interference from the estimated channel by multiplying the inverse metric with the estimated channel.

8 Claims, 3 Drawing Sheets

(56) References Cited

U.S. PATENT DOCUMENTS

| | | | |
|---|---|---|---|
| 6,731,706 B1 * | 5/2004 | Acharya et al. | 375/350 |
| 7,397,784 B2 | 7/2008 | Ryu et al. | |
| 7,944,964 B2 * | 5/2011 | Lee et al. | 375/231 |
| 2003/0091100 A1 * | 5/2003 | El Nahas El Homsi et al. | 375/143 |
| 2010/0054355 A1 * | 3/2010 | Kinjo et al. | 375/262 |

FOREIGN PATENT DOCUMENTS

| | | |
|---|---|---|
| KR | 10-2006-0098525 A | 9/2006 |
| WO | WO 99/57819 A1 | 11/1999 |

* cited by examiner

METHOD AND APPARATUS FOR CHANNEL ESTIMATION IN MULTI-PATH CHANNEL

CROSS REFERENCE TO RELATED APPLICATIONS

This application is the National Phase of PCT/KR2011/005055 filed on Jul, 11, 2011, which claims priority under 35 U.S.C. 119(e) to U.S. Provisional Application No. 61/368,264 filed on Jul. 28, 2010, all of which are hereby expressly incorporated by reference into the present application.

FIELD OF THE INVENTION

The present invention relates to channel estimation, and more particularly, a method and apparatus for channel estimation in a multipath channel.

BACKGROUND ART

A multipath fading indicates that electric waves received via different paths interact together due to multiple reflections by several objects so as to exhibit irregular amplitudes, phases, incident angles and so on in a specific place. The multipath fading, which is a main characteristic exhibited in land mobile telecommunications, may lower stability of a wireless network and cause a call drop.

Especially, an occurrence of deep fading may cause a call disconnection. The multipath fading influences on frequency domain, namely, is exhibited as a frequency selective fading, which influences on a narrow frequency area, a flat fading which influences on a broad frequency area, and the like. An influence of the multipath fading in a time domain is exhibited as an inter-symbol interference.

This specification relates to approximating a channel estimated upon recovering received data to an actual channel value by compensating for and mitigating (minimizing) a channel estimation error caused due to interference by the aforementioned multipath channel when receiving such data in a wireless communication.

The channel value estimated under an environment that the multipath channel interference occurs is different from an actual channel value, which may cause reception performance degradation. The multipath channel interference additionally occurs because impulse response values of a pulse shaping filter of a transmitting end (transmitter) and a pulse shaping filter of a receiving end (receiver) influence on each path according to relative synchronous positions of the multipath. Such additional interference has not been effectively mitigated (minimized) yet.

SUMMARY OF THE INVENTION

Therefore, an aspect of the detailed description is to provide an apparatus and method for allowing a channel estimation (value) to be the most approximate to an actual channel value, by mitigating a channel estimation error caused by transmitter and receiver pulse shaping filters in a wireless communication system.

To achieve these and other advantages and in accordance with the purpose of the present invention, as embodied and broadly described herein, there is provided a channel estimation method in a multipath channel including receiving a signal from a channel having multipath, obtaining information related to the number of paths and synchronization information related to each path from the received signal, estimating a channel using the obtained information related to the number of paths and synchronization information related to each path, calculating a metric using those obtained information and an impulse response value of Square Raised Cosine (SRRC) filter, and correcting the estimated channel using the calculated metric.

The impulse response value of the SRRC filter may be calculated based on a relative synchronous position of the multipath. The correcting of the estimated channel using the metric may include calculating an inverse value of the calculated metric, and correcting the estimated channel by multiplying the inverse value of the metric with the estimated channel.

The channel having the multipath may contain multipath interference. The obtaining of the number of paths and the synchronization information related to each path may be obtained from the received signal through oversampling.

In accordance with the channel estimation method in the multipath channel, the interference of the multipath can be minimized in the wireless communication system having the multipath channel, thus to maximize reliability of data received.

DETAILED DESCRIPTION OF THE INVENTION

Figure 1:
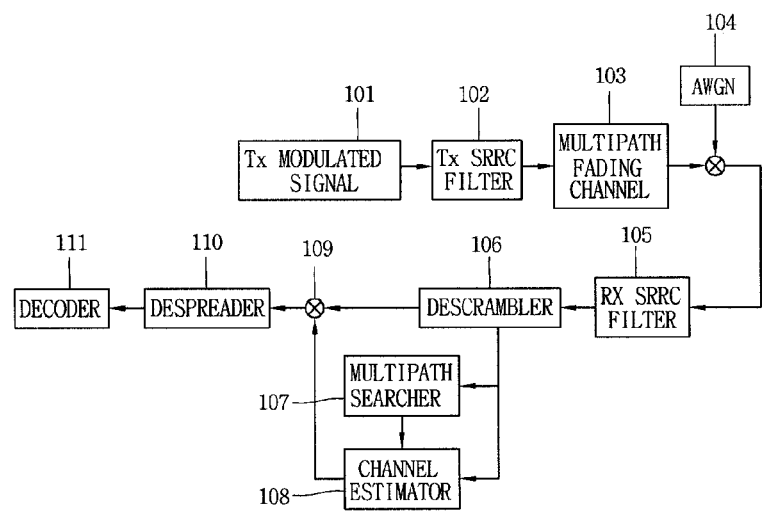
FIG. 1 is a block diagram illustrating a structure of a channel estimation apparatus in accordance with the related art.

Reference will now be made in detail to the preferred embodiments of the present invention, examples of which are illustrated in the accompanying drawings. It will also be apparent to those skilled in the art that various modifications and variations can be made in the present disclosure without departing from the spirit or scope of the invention. Thus, it is intended that the present disclosure cover modifications and variations of this invention provided they come within the scope of the appended claims and their equivalents.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. Term 'and/or' may represent a combination of a plurality of related disclosed items or any of the plurality of related disclosed items.

It will be understood that when an element is referred to as being "connected with" another element, the element can be directly connected with the other element or intervening elements may also be present. In contrast, when an element is referred to as being "directly connected with" another element, there are no intervening elements present.

Technical terms used in this specification are used to merely illustrate specific embodiments, and should be understood that they are not intended to limit the present disclosure. A singular representation may include a plural representation as far as it represents a definitely different meaning from the context. Terms 'include' or 'has' used herein should be understood that they are intended to indicate an existence of features, numbers, steps, operations or components or a combination thereof, disclosed in the specification, and it may also be understood that an existence of other features, numbers, steps, operations or components or a combination thereof or probability of addition thereof should not be excluded in advance.

As far as not being defined differently, all terms used herein including technical or scientific terms may have the same meaning as those generally understood by an ordinary person skilled in the art to which the present disclosure belongs, and should not be construed in an excessively comprehensive meaning or an excessively restricted meaning.

Embodiments of the present disclosure will be described below in detail with reference to the accompanying drawings where those components are rendered the same reference number that are the same or are in correspondence, regardless of the figure number, and redundant explanations are omitted.

First of all, description will be given of terms related to Square Root Raised Cosine (SRRC) used to explain the embodiment of the present disclosure. Root-Raised-Cosine (RRC) filters or SRRC filters in a signal processing are used as a transmit filter and a receive filter in a digital communication system to perform a matched filtering. An association response of the two filters may be a raised cosine filter.

The SRRC filter may be characterized by two parameters, namely, a roll-off factor and an inverse function $T_s$ of a symbol-rate. Unlike the RRC filter, an impulse response value of the SRRC filter may not be 0 (zero) at intervals $\pm T_s$. However, the association of the transmit filter and the receive filter creates a raised cosine filter whose impulse response value may be 0 (zero) at each interval $\pm T_s$. The impulse response value of the SRRC filter may be 0 (zero) only when the value of the roll-off factor is 0.

FIG. 1 is a block diagram illustrating a structure of a channel estimation apparatus in accordance with the related art. The channel estimation apparatus having the structure illustrated in FIG. 1 may include a transmit (Tx) SRRC filter 102, a receive (Rx) SRRC filter 105, a descrambler 106, a multipath searcher 107, a channel estimator 108, a channel compensator 109, a despreader 110, a decoder 111 and the like.

In the related art structure of the transmitter and receiver using the channel estimator 108, a transmit (Tx) modulated signal 101 is transmitted via the transmit SRRC filter 102. The Tx modulated signal passes through the multipath wireless (radio) fading channel 103 and the Additive White Gaussian Noise (AWGN) channel 104. Such Tx modulated signal 101 is then received via the Rx SRRC filter 105 and descrambled by the descrambler 106. Here, the Tx modulated signal may include a signal, which is spread and scrambled prior to modulation.

The multipath searcher 107 acquires the number of paths and synchronization information related to each of the paths from the descrambled signal. The channel estimator 108 then estimates channel values using such information. A channel compensation is performed by the channel compensator 109 using the estimated channel values, and symbol data is obtained by the despreader 110, and transmitted data is recovered by the decoder 111.

In the multipath channel environment illustrated in FIG. 1, the multipath searcher 107 is required to provide signal related synchronization information. The channel estimator 108 may estimate a channel of each path using the provided multipath synchronization information. For example, if it is assumed that there is a multipath channel having L paths, the multipath searcher 107 may search for L synchronization information. The channel estimator 108 may then estimate channel values of the respective L different paths using the synchronization information. A representative channel estimation method for each path may be an algorithm using a pilot channel.

Channel values may typically be estimated by acquiring symbol data through de-scrambling and despreading, and removing a pilot value of the symbol data by multiplying a previously known pilot and a complex conjugate. The received signal may be expressed by the following Equation 1. Here, it is assumed that power of each channel is 1.

$$y(t) = \sum_{l=1}^{L} c(t-\tau_1) \cdot s_{SFd}(t-\tau_1) \cdot x_d(t-\tau_1) \cdot h_1(t) + \quad \text{[Equation 1]}$$

$$\sum_{l=1}^{L} c(t-\tau_1) \cdot s_{SFp}(t-\tau_1) \cdot x_p(t-\tau_1) \cdot h_1(t) + n(t)$$

where y denotes a received signal, $x_d$ denotes a data signal, $x_p$ denotes a pilot signal, c denotes a scrambling code, $s_{SFd}$ denotes a data Orthogonal Variable Spreading Factor (OVSF) code, $s_{SFp}$ denotes a pilot OVSF code, $h_1$ denotes an $1^{th}$ fading channel coefficient, L denotes the number of paths, and n denotes AWGN. Also, the descrambling of the $1^{th}$ path will be given by the following Equation 2 (c*.c*=1).

$$y_l^1(t) = y(t) \cdot c^*(t-\tau_1) \quad \text{[Equation 2]}$$

$$y_l^1(t) = \sum_{l=1}^{L} s_{SFd}(t-\tau_1) \cdot x_d(t-\tau_1) \cdot h_1(t) +$$

$$\sum_{l=1}^{L} s_{SFp}(t-\tau_1) \cdot x_p(t-\tau_1) \cdot h_1(t) + n^1(t)$$

The despreading of the $1^{th}$ path will be given by the following Equation 3.

$$y_1^2(t) = \sum_{1}^{SF_p} y_l^1(t) \cdot s_{SFp}(t-\tau_1) \quad \text{[Equation 3]}$$

$$y_1^2(t) = SFp \cdot (t-\tau_1) \cdot h_1(t) + \sum_{1}^{SF_p} s_{SFp}(t-\tau_1) \cdot n^1(t)$$

$$y_1^2(t) = SFp \cdot x_p(t-\tau_1) \cdot h_1(t) + 0$$

where the OVSF codes of the data channel and the pilot channel are orthogonal to each other. Accordingly, if the received data channel is despread by the pilot OVSF code, the despread value become 0, regardless of a synchronization between the two channels.

However, for pilot channels, the despread value is 0 only when the pilot channels are not synchronized with each other, while the despread value is SFp when they are synchronized ($s_{SFp}(t-\tau_1) \cdot s_{SFp}(t-\tau_1)=1$).

$$\sum_1^{SFp} s_{SFd}(t - \tau_{(1,\ldots,1,\ldots,L)}) \cdot s_{SFp}(t - \tau_1) = 0$$

$$\sum_1^{SFp} s_{SFp}(t - \tau_1) \cdot s_{SFp}(t - \tau_{\neq 1}) = 0$$

$$\sum_1^{SFp} s_{SFp}(t - \tau_1) \cdot s_{SFp}(t - \tau_1) = SFp$$

[Equation 4]

The state after removing the pilot symbol on the $1^{th}$ path will be expressed by the following Equation 5.

$$y_1^3(t) = y_1^3(t) \cdot x_p^*(t-\tau_1)$$

$$y_1^3(t) = SFp \cdot x_p(t-\tau_1) \cdot h_1(t) \cdot x_p^*(t-\tau_1)$$

$$y_1^3(t) = SFp \cdot h_1(t)$$

where $x_p(t-\tau_1) \cdot x_p^*(t-\tau_1)=1$. [Equation 5]

In Equation 5, the channel value of the $1^{th}$ path may be obtained by dividing $y_1^3(t)$ by SFp.

The channel estimated value of the $1^{th}$ path will be expressed by the following Equation 6.

$$\hat{h}_1(t) = SFp \cdot \frac{h_1(t)}{SFp} = h_1(t)$$

[Equation 6]

As such, the channel value of each path can be estimated.

However, this method has not concerned about influences exhibited upon actual implementation. In the actual implementation, a transmitter pulse shaping filter and a receiver pulse shaping filter are used. A channel estimation for each path of the final (last) receiver is influenced by impulse response values of the transmitter and receiver pulse shaping filters. Hereinafter, description will be given of the channel estimation according to existence and non-existence of multipath interference.

Figure 2:
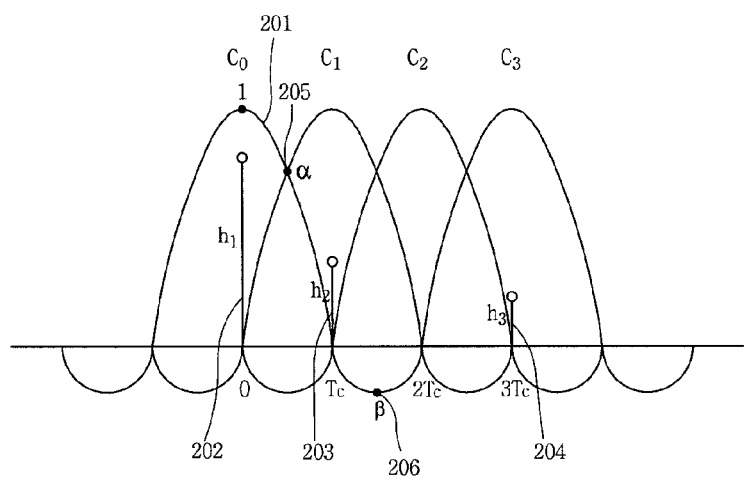
FIG. 2 is an exemplary view illustrating transmit and receive SRRC filter impulse responses without multipath interference.

FIG. 2 is an exemplary view illustrating transmit and receive SRRC filter impulse responses without multipath interference.

FIG. 2 illustrates transmit and receive SRRC filter impulse responses at a position 0 (i.e., 201), as the transmit and receive SRRC filter impulse responses without the multipath interference, a channel of a first path $h_1$ at a position –0 (i.e., 202), a channel of a second path $h_2$ at a position –Tc (i.e., 203), a channel of a third path $h_3$ at a position –3Tc (i.e., 204), an impulse response at a position Tc/2 based on the first path $h_1$ (i.e., 205), an impulse response at a position 3Tc/2 based on the first path $h_1$ (i.e., 206), scrambling codes C0, C1, C2, C3 . . . , and the like.

As illustrated in FIG. 2, transmit and receive SRRC filter impulse response values of a path at a position corresponding to integer times of Tc based on a reference path are 0. Here, it is assumed for the sake of explanation that the number of paths (multipath number) is 3 (L=3).

Assumption: L=3 ($\tau_1,\tau_2,\tau_3$)=(0,$T_c$,$3T_c$).

Based on the first path (position 0)

Relative position of the second path=–Tc->transmit and receive SRRC filter impulse response values=0

Relative position of the third path=–3Tc->transmit and receive SRRC filter impulse response values=0

Based on the second path (position Tc)

Relative position of the first path=Tc->transmit and receive SRRC impulse response values=0

Relative position of the third path=–2Tc->transmit and receive SRRC filter impulse response values=0

Based on the third path (position 3Tc)

Relative position of the first path=3Tc->transmit and receive SRRC impulse response values=0

Relative position of the second path=2Tc->transmit and receive SRRC filter impulse response values=0

In FIG. 2, the three paths $h_1$, $h_2$, $h_3$ are present at the positions 0, Tc and 3Tc, respectively, and the transmit and receive SRRC filter impulse response values of an adjacent chip at the relative position based on each path are '0.' Hence, in this case, it may be understood that no multipath interference occurs. Table 1 shows only scrambling code elements of a signal existing at each position by Tc/2 unit.

TABLE 1

|  | 0 | Tc/2 | Tc | 3Tc/2 | 2Tc | 5Tc/2 | 3Tc | 7Tc/2 |
|---|---|---|---|---|---|---|---|---|
| $h_1$ | $C_0$ | $\alpha C_0$, $\alpha C_1$, $\beta C_{-1}$, $\beta C_2$ | $C_1$ | $\alpha C_1$, $\alpha C_2$, $\beta C_0$, $\beta C_3$ | $C_2$ | $\alpha C_2$, $\alpha C_3$, $\beta C_1$, $\beta C_4$ | $C_3$ | $\alpha C_3$, $\alpha C_4$, $\beta C_2$, $\beta C_5$ |
| $h_2$ | $C_{-1}$ | $\alpha C_{-1}$, $\alpha C_0$, $\beta C_{-2}$, $\beta C_1$ | $C_0$ | $\alpha C_0$, $\alpha C_1$, $\beta C_{-1}$, $\beta C_2$ | $C_1$ | $\alpha C_1$, $\alpha C_2$, $\beta C_0$, $\beta C_3$ | $C_2$ | $\alpha C_2$, $\alpha C_3$, $\beta C_1$, $\beta C_4$ |
| $h_3$ | $C_{-3}$ | $\alpha C_{-3}$, $\alpha C_{-2}$, $\beta C_{-4}$, $\beta C_{-1}$ | $C_{-2}$ | $\alpha C_{-2}$, $\alpha C_{-1}$, $\beta C_{-3}$, $\beta C_0$ | $C_{-1}$ | $\alpha C_{-1}$, $\alpha C_0$, $\beta C_{-2}$, $\beta C_1$ | $C_0$ | $\alpha C_0$, $\alpha C_1$, $\beta C_{-1}$, $\beta C_2$ |

An actually received signal y of FIG. 2 has a form obtained by multiplying every scrambling codes existing at sampling positions of Table 1 with actual channel elements and thereafter adding each path. Examining the received signal at a synchronous position 0, Tc, 3Tc of each path, the following results may be exhibited.

Position 0: $y = c_0 \cdot s \cdot x \cdot h_1 + c_{-1} \cdot s \cdot x \cdot h_2 + c_{-3} \cdot s \cdot x \cdot h_3$ Position Tc: $y = c_1 \cdot s \cdot x \cdot h_1 + c_0 \cdot s \cdot x \cdot h_2 + c_{-2} \cdot s \cdot x \cdot h_3$ Position 3Tc: $y = c_3 \cdot s \cdot x \cdot h_1 + c_2 \cdot s \cdot x \cdot h_2 + c_0 \cdot s \cdot x \cdot h_3$ [Equation 7]

When estimating a channel for each path by sampling the received signal with 1-chip interval at the synchronous position 0, Tc, 3Tc of each path, and sequentially performing descrambling, despreading and pilot removing with respect to the sampled signal, any interference element with respect to an adjacent channel is not found as given by Equation 8.

$\hat{h}_1 = h_1$ $\hat{h}_2 = h_2$ $\hat{h}_3 = h_3$ [Equation 8]

Figure 3:
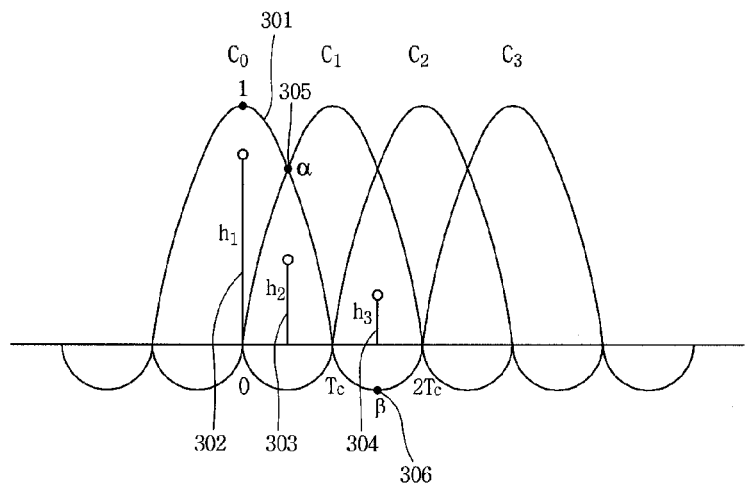
FIG. 3 is an exemplary view illustrating transmit and receive SRRC filter impulse responses including multipath interference.

FIG. 3 is an exemplary view illustrating transmit and receive impulse responses including multipath interference.

FIG. 3 illustrates transmit and receive SRRC filter impulse responses at a position 0 (i.e., 301) as transmit and receive SRRC filter impulse responses with multipath interference, a channel of a first path $h_1$ at a position –0 (i.e., 302), a channel of a second path $h_2$ at a position –Tc/2 (i.e., 303), a channel of a third path $h_3$ at a position –3Tc/2 (i.e., 304), an impulse response at a position Tc/2 based on the first path $h_1$ (i.e., 305), an impulse response at a position 3Tc/2 based on the first path $h_1$ (i.e., 306), scrambling codes C0, C1, C2, C3 . . . , and the like. Here, it is assumed for the sake of explanation that the number of paths is 3 (L=3).

Assumption: L=3 $(\tau_1,\tau_2,\tau_3)=(0,T_c/2,3T_c/2)$

Based on the first path (position 0)
Relative position of the second path=−Tc/2->transmit and receive SRRC filter impulse response values=a
Relative position of the third path=−3Tc/2->transmit and receive SRRC filter impulse response values=β

Based on the second path (position Tc/2)
Relative position of the first path=Tc/2->transmit and receive SRRC filter impulse response values=α
Relative position of the third path=−Tc->transmit and receive SRRC filter impulse response values=0

Based on the third path (position 3Tc/2)
Relative position of the first path=3Tc/2->transmit and receive SRRC filter impulse response values=β
Relative position of the second path=Tc->transmit and receive SRRC filter impulse response values=0

As illustrated in FIG. 3, when the three paths $h_1$, $h_2$ and $h_3$ are present at the positions 0, Tc/2 and 3Tc/2, respectively, a signal of each path is influenced by the impulse response values α and β of the transmitter and receiver pulse shaping filters of an adjacent chip, thereby occurring multipath interference, which causes a channel estimation error. Table 2 shows the channel estimation errors of FIG. 3.

TABLE 2

|   | 0 | Tc/2 | Tc | 3Tc/2 | 2Tc | 5Tc/2 | 3Tc | 7Tc/2 |
|---|---|------|----|----|----|----|----|----|
| $h_1$ | $C_0$ | $\alpha C_0$, $\alpha C_1$, $\beta C_{-1}$, $\beta C_2$ | $C_1$ | $\alpha C_1$, $\alpha C_2$, $\beta C_0$, $\beta C_3$ | $C_2$ | $\alpha C_2$, $\alpha C_3$, $\beta C_1$, $\beta C_4$ | $C_3$ | $\alpha C_3$, $\alpha C_4$, $\beta C_2$, $\beta C_5$ |
| $h_2$ | $\alpha C_{-1}$, $\alpha C_0$, $\beta C_{-2}$, $\beta C_1$ | $C_0$ | $\alpha C_0$, $\alpha C_1$, $\beta C_{-1}$, $\beta C_2$ | $C_1$ | $\alpha C_1$, $\alpha C_2$, $\beta C_0$, $\beta C_3$ | $C_2$ | $\alpha C_2$, $\alpha C_3$, $\beta C_1$, $\beta C_4$ | $C_3$ |
| $h_3$ | $\alpha C_{-2}$, $\alpha C_{-1}$, $\beta C_{-3}$, $\beta C_0$ | $C_{-1}$ | $\alpha C_{-1}$, $\alpha C_0$, $\beta C_{-2}$, $\beta C_1$ | $C_0$ | $\alpha C_0$, $\alpha C_1$, $\beta C_{-1}$, $\beta C_2$ | $C_1$ | $\alpha C_1$, $\alpha C_2$, $\beta C_0$, $\beta C_3$ | $C_2$ |

As shown in Table 2, a received signal y of the synchronous position 0, Tc/2, 3Tc/2 of each path will be expressed according to Equation 9.

Position 0: $y = c_0 \cdot s \cdot x \cdot h_1 + (\alpha c_{-1} + \alpha c_0 + \beta c_{-2} + \beta c_1) \cdot s \cdot x \cdot h_2 + (\alpha c_{-2} + \alpha c_{-1} + \beta c_{-3} + \beta c_0) \cdot s \cdot x \cdot h_3$ Position Tc/2: $y = (\alpha c_0 + \alpha c_1 + \beta c_{-1} + \beta c_2) \cdot s \cdot x \cdot h_1 + c_0 \cdot s \cdot x \cdot h_2 + c_{-1} \cdot s \cdot x \cdot h_3$ Position 3Tc/2: $y = (\alpha c_1 + \alpha c_2 + \beta c_0 + \beta c_3) \cdot s \cdot x \cdot h_1 + c_1 \cdot s \cdot x \cdot h_2 + c_0 \cdot s \cdot x \cdot h_3$ [Equation 9]

When estimating a channel for each path by sampling the received signal with 1-chip interval at the synchronous position 0, Tc, 3Tc of each path, and sequentially performing descrambling, despreading and pilot removing with respect to the sampled signal, the interference element with respect to an adjacent channel is found as given by Equation 10.

$\hat{h}_1 = h_1 + \alpha \cdot h_2 + \beta \cdot h_3$ $\hat{h}_2 = \alpha \cdot h_1 + h_2$ $\hat{h}_3 = \beta \cdot h_1 + h_3$ [Equation 10]

An interference element of the first path $h_1$ is $\alpha \cdot h_2 + \beta \cdot h_3$, an interference element of the second path $h_2$ is $\alpha \cdot h_1$, and an interference element of the third path $h_3$ is $\beta \cdot h_1$. If the first path h1 and the second path $h_2$ or the third path $h_3$ have a great power difference ($\alpha \cdot h_1 \gg h_2$, $\beta \cdot h_1 \gg h_3$), channel estimated values of the second path $h_2$ and the third path $h_3$ will be expressed according to Equation 11.

$\hat{h}_2 = \alpha \cdot h_1$ $\hat{h}_3 = \beta \cdot h_1$ [Equation 11]

In this case, the channel estimated values of the second and third paths $h_2$ and $h_3$ are exhibited at the rate of α and β of the first path value, thereby estimating a wrong channel. Consequently, an entire reception performance may be degraded. The present disclosure relates to a method for mitigating such error.

Figure 4:
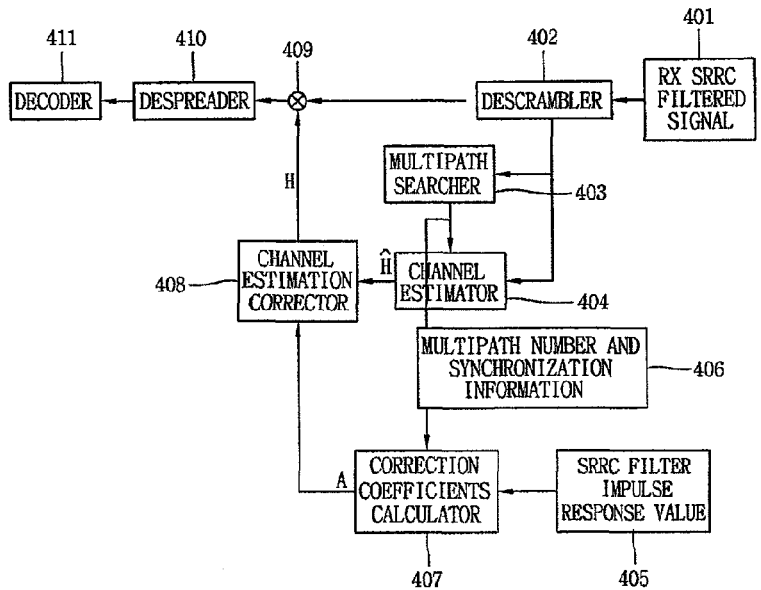
FIG. 4 is a block diagram illustrating a structure of a channel estimation apparatus using a channel estimation corrector in accordance with one exemplary embodiment.

FIG. 4 is a block diagram illustrating a structure of a channel estimation apparatus using a channel estimation corrector in accordance with one exemplary embodiment.

The apparatus with the structure illustrated in FIG. 4 may include a descrambler 402, a multipath searcher 403, a channel estimator 404, a storage 405, a correction coefficients calculator 407, a channel estimation corrector 408, a channel compensator 409, despreader 410 and a decoder 411.

As illustrated in FIG. 4, the configuration in this specification may further include the correction coefficients calculator 407 and the channel estimation corrector 408, in addition to the structure of the related art channel estimation apparatus. A channel value estimated by the channel estimator 404 in FIG. 4 may actually contain an error due to multipath interference. To correct such error, the calculator 407 calculates a metric of transmit and receive SRRC filter impulse response values, stored in the storage 405, at a relative position of each path based on the information related to the number of paths and synchronization information related to each path 406 obtained by the multipath searcher 403. An inverse function value of the metric A is obtained from the calculated correction coefficient metric. The channel estimation corrector 408 performs a metric multiplying operation with the channel estimated value $\hat{H}$, thus to obtain a value approximate to an actual channel value H. A channel compensation is performed by the channel compensator 409 using the corrected channel estimation values, and symbol data is obtained by the despreader 410, and transmitted data is recovered by the decoder 411.

For explanation, it is assumed that the number of paths is 3 (L=3) and the synchronous positions of the respective paths are 0, Tc/2 and 3Tc/2. The channel estimated value of each path obtained according to the related art is as follows. Those values contain the multipath interference.

$\hat{h}_1 = h_1 + \alpha \cdot h_2 + \beta \cdot h_3$ $\hat{h}_2 = \alpha \cdot h_1 + h_2$ $\hat{h}_3 = \beta \cdot h_1 + h_3$ [Equation 12]

Information related to the multipath number 406 and the multipath synchronization 406 may be obtained by the multipath searcher 403. α and β may be obtained from the impulse response values, stored in the storage 405, of the transmitter and receiver pulse shaping filters existing at the relative synchronous position of the multipath. The following Equation 13 expresses a matrix of the above equation.

$$\begin{bmatrix} \hat{h}_1 \\ \hat{h}_2 \\ \hat{h}_3 \end{bmatrix} = \begin{bmatrix} 1 & \alpha & \beta \\ \alpha & 1 & 0 \\ \beta & 0 & 1 \end{bmatrix} \begin{bmatrix} h_1 \\ h_2 \\ h_3 \end{bmatrix}$$
[Equation 13]

If an actual channel value is obtained according to the above equation, the result may be given by the following Equation 14.

$$\begin{bmatrix} h_1 \\ h_2 \\ h_3 \end{bmatrix} = \begin{bmatrix} 1 & \alpha & \beta \\ \alpha & 1 & 0 \\ \beta & 0 & 1 \end{bmatrix}^{-1} \begin{bmatrix} \hat{h}_1 \\ \hat{h}_2 \\ \hat{h}_3 \end{bmatrix}$$
[Equation 14]

Hence, the actual channel value may be obtained by the channel estimated value and the metric inverse function value of the impulse response values of the transmitter and receiver pulse shaping filters obtained at the multipath synchronous position.

Figure 5:
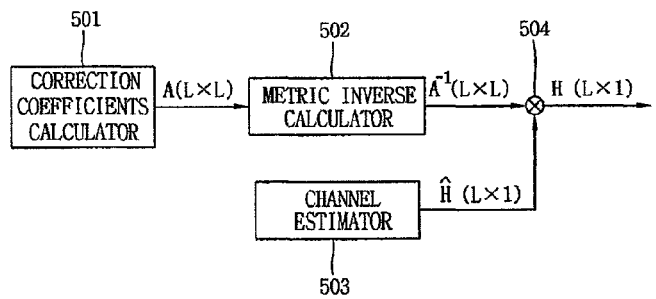
FIG. 5 is a block diagram illustrating a channel corrector is generalized in accordance with one exemplary embodiment.

FIG. 5 is a block diagram of a generalized channel corrector in accordance with one exemplary embodiment.

The channel corrector with the structure illustrated in FIG. 5 may include a correction coefficients calculator 501, a metric inverse calculator 502, a channel estimator 503 and the like. As illustrated in FIG. 5, when the channel estimator of FIG. 4 is generalized, it will be expressed as follows (multipath number=L).

$$H = A^{-1}\hat{H}$$
[Equation 15]

H: actual channel value (L×1)

A: metric of impulse response values of transmitter and receiver pulse shaping filters at a relative synchronous position of multipath L (L×L)

$\hat{H}$: channel estimated value (L×1)

The metric of the impulse response values of the transmitter and receiver pulse shaping filters may be obtained as follows.

$$A = \begin{bmatrix} a_{1,1} & a_{1,2} & \cdots & a_{1,L} \\ a_{2,1} & a_{2,2} & \cdots & a_{2,L} \\ \vdots & \vdots & \ddots & \vdots \\ a_{L,L} & a_{L,2} & \cdots & a_{L,L} \end{bmatrix}$$
[Equation 16]

Here, an element $a_{n,m}$ of (n, m) in a metric A denotes an impulse response value of a pulse shaping filter that $m^{th}$ path influences on $n^{th}$ path. A diagonal element at the metric A is an impulse response of the pulse shaping filter that it influences on itself, so its value is 1. An impulse response value of a pulse shaping filter with respect to another path degraded to integer times of Tc based on the $n^{th}$ path is 0.

$a_{n,m}=1$: n=m $a_{n,m}=0$: (sync of $n^{th}$ path−sync of $m^{th}$ path)=integer times of Tc Therefore, in a normal case, the actual channel value may be obtained by the following equation.

$$\begin{bmatrix} h_1 \\ h_2 \\ \vdots \\ h_3 \end{bmatrix} = \begin{bmatrix} 1 & a_{1,2} & \cdots & a_{1,L} \\ a_{2,1} & 1 & \cdots & a_{2,L} \\ \vdots & \vdots & \ddots & \vdots \\ a_{L,L} & a_{L,2} & \cdots & 1 \end{bmatrix}^{-1} \begin{bmatrix} \hat{h}_1 \\ \hat{h}_2 \\ \vdots \\ \hat{h}_3 \end{bmatrix}$$
[Equation 17]

A metric inverse value $A^{-1}$ is obtained from the calculated correction coefficient metric, and a metric multiplying operation 504 is carried out with respect to the channel estimated value $\hat{H}$, thereby obtaining a value approximated to an actual channel value H. It may thusly be understood that the actual channel value H can be obtained any time when the impulse metric values of the transmitter and receiver pulse shaping filters according to the channel estimated value of the channel estimator and the relative position of the multipath.

Figure 6:
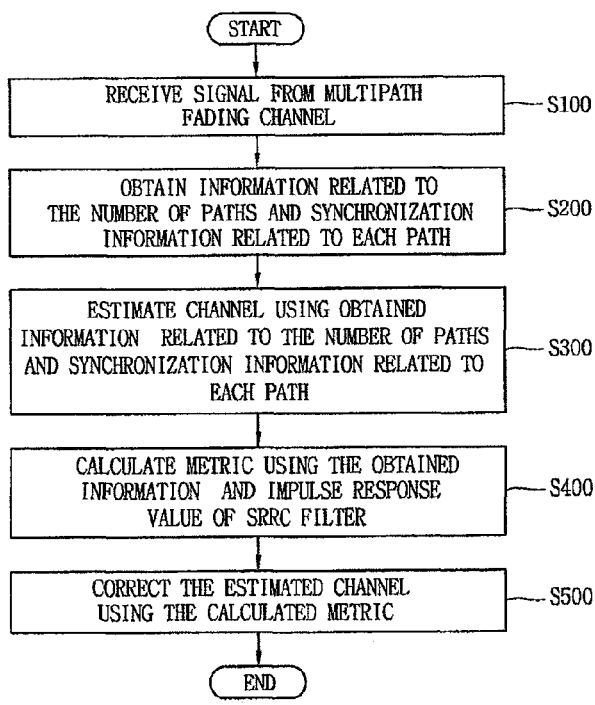
FIG. 6 is a flowchart illustrating a channel estimation method in accordance with one exemplary embodiment.

FIG. 6 is a flowchart illustrating a channel estimation method in accordance with on exemplary embodiment.

The channel estimation method may include receiving a signal from a multipath fading channel (S100), obtaining information related to the number of paths and synchronization information related to each path (S200), estimating a channel using the obtained information related to the number of paths and synchronization information related to each path (S300), calculating a metric using those obtained information and an impulse response value of Square Root Raised Cosine (SRRC) filter (S400), and correcting the estimated channel using the calculated metric (S500).

Figure 7:
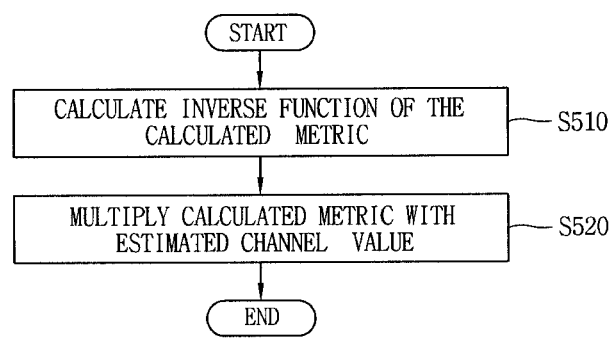
FIG. 7 is a flowchart illustrating in detail Step S500 of correcting the estimated channel using the metric.

FIG. 7 is a flowchart illustrating in detail Step S500 of correcting the estimated channel using the metric.

The correcting of the estimated channel value using the metric (S500) may include calculating an inverse function value of the calculated metric (S510), and multiplying the calculated metric with the estimated channel value (S520).

In accordance with one exemplary embodiment, the present disclosure provides a channel estimation method in a multipath channel. The method may include receiving a signal from a channel having multipath, obtaining information related to number of paths and synchronization information related to each path from the received signal, estimating a channel using the obtained information related to the number of paths and synchronization information related to each path, calculating a metric using those obtained information and an impulse response value of Square Raised Cosine (SRRC) filter, and correcting the estimated channel using the calculated metric.

The impulse response value of the SRRC filter may be calculated based on a relative synchronous position of the multipath.

The correcting of the estimated channel using the metric may include calculating an inverse value of the calculated metric, and correcting the estimated channel value by multiplying the inverse value of the metric with the estimated channel value.

In accordance with one exemplary embodiment, the present disclosure provides a channel estimation apparatus. The apparatus may include a receiver configured to receive a signal from a channel having multipath, a calculator configured to obtain information related to the number of paths and synchronization information related to each path from the received signal, an estimator configured to estimate a channel using the obtained information related to the number of paths and synchronization information related to each path, and a controller configured to calculate a metric using those obtained information and an impulse response value of Square Raised Cosine (SRRC) filter, and to correct the estimated channel value using the calculated metric.

The device described above may be referred to as a terminal, and include any device which is capable of implementing the exemplary embodiments illustrated in FIGS. 2 to 7. That is, the device described in this specification, namely, the terminal may comprehensively include mobile communication terminals (e.g., user equipment (UE), a mobile phone, a cellular phone, a DMB phone, a DVB-H phone, a PDA phone, a PTT phone and the like), digital TV, GPS navigator, portable game machine, MP3 and other home alliances.

The method having described so far may be implemented by software, hardware or combination thereof. For example, the method may be stored in a storage medium (for example, an internal memory of a terminal, a flash memory, a hard disc, etc.), and implemented as codes or commands within a software program, which may be executed by a processor (for example, a microprocessor within the terminal).

The configurations and methods of the channel estimation in multipath channel in the aforesaid embodiments may not be limitedly applied, but such embodiments may be configured by a selective combination of all or part of each embodiment so as to derive many variations.

The invention claimed is:

1. A channel estimation method in a multipath channel, the method comprising:
    receiving a signal from a channel that is the multipath channel;
    obtaining information related to a number of paths and synchronization information related to each path from the received signal;
    estimating a channel using the obtained information related to the number of paths and synchronization information related to each path;
    calculating a metric using at least one impulse response value of a Square Root Raised Cosine (SRRC) filter and the obtained information;
    calculating an inverse metric of the calculated metric; and
    removing an inter-path interference from the estimated channel by multiplying the inverse metric with the estimated channel,
    wherein the removing of the inter-path interference from the estimated channel is obtained by the following equation:

$$\begin{bmatrix} h_1 \\ h_2 \\ h_3 \\ \vdots \\ h_L \end{bmatrix} = \begin{bmatrix} a_{1,1} & a_{1,2} & a_{1,3} & \cdots & a_{1,L} \\ a_{2,1} & a_{2,2} & a_{2,3} & \cdots & a_{2,L} \\ a_{3,1} & a_{3,2} & a_{3,3} & \cdots & a_{3,L} \\ \vdots & \vdots & \vdots & \ddots & \vdots \\ a_{L,1} & a_{L,2} & a_{L,3} & \cdots & a_{L,L} \end{bmatrix}^{-1} \begin{bmatrix} \hat{h}_1 \\ \hat{h}_2 \\ \hat{h}_3 \\ \vdots \\ \hat{h}_L \end{bmatrix},$$

where $h_i$ denotes an i-th path of the multipath channel, $a_{n,m}$ denotes the at least one impulse response value of the SRRC filter path, $\hat{h}_j$ denotes a j-th path of the estimated channel, L denotes the number of paths,
wherein $a_{n,m}$ is 1 if n equals m, and
wherein $a_{n,m}$ represents an interference influence from m-th path to an n-th path if n is different from m, and $a_{n,m}$ is set to 0 if a difference between synchronization positions of the m-th path and the n-th path is equal to an integer multiple of a time constant Tc between the m-th path and the n-th path of the SRRC filter.

2. The method of claim 1, wherein the at least one impulse response value of the SRRC filter is calculated based on a relative synchronous position of the multipath.

3. The method of claim 1, wherein the inter-path interference indicates an interference between paths of the multipath.

4. The method of claim 1, wherein the obtaining of information related to the number of paths and the synchronization information related to each path from the received signal is carried out by oversampling.

5. A channel estimation apparatus in a multipath channel comprising:
    a receiver configured to receive a signal from a channel that is the multipath channel;
    a calculator configured to obtain information related to a number of paths and synchronization information related to each path from the received signal;
    an estimator configured to estimate the channel using the obtained information related to the number of paths and the synchronization information related to each path; and
    a controller configured to calculate a metric using at least one impulse response value of a Square Root Raised Cosine (SRRC) filter and the obtained information, to calculate an inverse metric of the calculated metric, and to remove an inter-path interference from the estimated channel by multiplying the inverse metric with the estimated channel,
    wherein the controller is further configured to obtain the estimated channel with the removed inter-path interference by the following equation:

$$\begin{bmatrix} h_1 \\ h_2 \\ h_3 \\ \vdots \\ h_L \end{bmatrix} = \begin{bmatrix} a_{1,1} & a_{1,2} & a_{1,3} & \cdots & a_{1,L} \\ a_{2,1} & a_{2,2} & a_{2,3} & \cdots & a_{2,L} \\ a_{3,1} & a_{3,2} & a_{3,3} & \cdots & a_{3,L} \\ \vdots & \vdots & \vdots & \ddots & \vdots \\ a_{L,1} & a_{L,2} & a_{L,3} & \cdots & a_{L,L} \end{bmatrix}^{-1} \begin{bmatrix} \hat{h}_1 \\ \hat{h}_2 \\ \hat{h}_3 \\ \vdots \\ \hat{h}_L \end{bmatrix},$$

where $h_i$ denotes an i-th path of the multipath channel, $a_{n,m}$ denotes the at least one impulse response value of the SRRC filter path, $\hat{h}_j$ denotes a j-th path of the estimated channel, L denotes the number of paths,
wherein $a_{n,m}$ is 1 if n equals m, and
wherein $a_{n,m}$ represents an interference influence from m-th path to an n-th path if n is different from m, and $a_{n,m}$ is set to 0 if a difference between synchronization positions of the m-th path and the n-th path is equal to an integer multiple of a time constant Tc between the m-th path and the n-th path of the SRRC filter.

6. The apparatus of claim 5, wherein the at least one impulse response value of the SRRC filter is calculated based on a relative synchronous position of the multipath.

7. The apparatus of claim 5, wherein the inter-path interference indicates an interference between paths of the multipath.

8. The apparatus of claim 5, wherein the information related to the number of paths and the synchronization information related to each path are obtained from the received signal by oversampling.

* * * * *